United States Patent
Modi et al.

(10) Patent No.: US 7,403,535 B2
(45) Date of Patent: Jul. 22, 2008

(54) AGGREGATION OF NETWORK RESOURCES PROVIDING OFFLOADED CONNECTIONS BETWEEN APPLICATIONS OVER A NETWORK

(75) Inventors: Prashant Modi, Pleasanton, CA (US); Amitabha Biswas, San Francisco, CA (US); Yiu Yip, Cupertino, CA (US); Doris Sayon, Sunnyvale, CA (US); Kathryn Hampton, Los Gatos, CA (US); Mehrdad Khalili, San Jose, CA (US); Robert R. Teisberg, Georgetown, TX (US); Daniel N. Cripe, Round Rock, TX (US); Charles L. Hudson, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 667 days.

(21) Appl. No.: 11/013,185

(22) Filed: Dec. 14, 2004

(65) Prior Publication Data

US 2006/0165074 A1    Jul. 27, 2006

(51) Int. Cl.
*H04J 3/16* (2006.01)
*H04J 3/22* (2006.01)
(52) U.S. Cl. .................. 370/401; 370/468; 709/227
(58) Field of Classification Search ............. 370/389, 370/400, 401, 464, 465, 466; 709/227, 226, 709/228, 229
See application file for complete search history.

(56) References Cited

U.S. PATENT DOCUMENTS

| 2006/0075119 | A1* | 4/2006 | Hussain et al. ............ 709/227 |
| 2006/0168281 | A1* | 7/2006 | Starr et al. ............... 709/230 |
| 2007/0061417 | A1* | 3/2007 | Berg ....................... 709/217 |
| 2007/0064724 | A1* | 3/2007 | Minami et al. ........... 370/463 |
| 2007/0136374 | A1* | 6/2007 | Guedalia ............... 707/104.1 |
| 2007/0283007 | A1* | 12/2007 | Keir et al. ............... 709/224 |

* cited by examiner

*Primary Examiner*—Ajit G Patel

(57) ABSTRACT

A computer system aggregates a plurality of network resources of a computer system. The plurality of network resources forms a bypass stack operable to provide offloaded connections to one or more applications available on the computer system. Each of the applications is associated with a first port number. The computer system itself is addressable on the network by a public IP address. The system assigns private IP addresses to uniquely identify each of the plurality of network resources. The system creates a socket for each application by which the application can communicate with the network. The socket is associated with a first endpoint tuple that includes the public IP address and the first port number associated with the application for which the socket is created. The socket is further associated with a set of bypass endpoint tuples that are translated from the first endpoint tuple, each of the set including a different one of the private IP addresses. Each of the bypass endpoint tuples is available to be a transport address to define an offloaded connection to the application through one of the network resources. The created socket can be a listening one at a server node or a connection one at a client node.

64 Claims, 5 Drawing Sheets

AGGREGATION OF NETWORK RESOURCES PROVIDING OFFLOADED CONNECTIONS BETWEEN APPLICATIONS OVER A NETWORK

CROSS-REFERENCE TO RELATED APPLICATIONS

The subject matter of this application is related to the following applications filed concurrently herewith: "Managing Connections through an Aggregation of Network Resources Providing Offloaded Connections between Applications over a Network;" and "Aggregation over Multiple Processing Nodes of Network Resources Providing Offloaded Connections between Applications over a Network."

BACKGROUND

Computers and other devices are commonly interconnected to facilitate communication among one another using any one of a number of available standard network architectures and any one of several corresponding and compatible network protocols. The physical nature of standard architectures and their topologies is typically dictated at the first two layers of the OSI (Open Systems Interconnection) Basic Reference Model for networks; they are known as the physical layer (layer 1) and the data link layer (layer 2). One of the most commonly deployed of such standard architectures is the Ethernet® network architecture. Other types of network architectures that are less widely implemented include ARCnet, Token Ring and FDDI. Variations of the Ethernet® standard are differentiated from one another based on characteristics such as maximum throughput (i.e. the highest data transmission rate) of devices coupled to the network, the type of medium used for physically interconnecting the devices (e.g. coaxial cable, twisted pair cable, optical fibers, etc.) to the network and the maximum permissible length of the medium.

Network connection speeds have been increasing at a substantial rate. The 10Base-T and 100Base-T Ethernet® standards, for example, designate a maximum throughput of 10 and 100 Megabits per second respectively, and are coupled to the network over twisted pair cable. The 1000Base-T (or Gigabit) Ethernet® standard designates a maximum throughput of 1000 Mbps (i.e. a Gigabit per second) over twisted pair cable. Continued advancement in the speed of integrated circuits has facilitated the development of even faster variations of the Ethernet® network architecture, such as one operating at 10 Gigabits per second (10 Gbps) and for which the transmission medium is typically optical fibers. Of course, the greater the throughput, the more expensive the network resources required to sustain that throughput. Ethernet® is a registered trademark of Xerox Corporation.

Packet switched network protocols are often employed over the physical and link layers described above. They dictate the formatting of data into packets by which data can be transmitted over the network using virtual connections established between peer applications running on devices coupled to the network. They also dictate the manner in which these virtual connections are established and torn down. These protocols are defined by layer 3 (network layer) and layer 4 (transport layer) of the OSI and typically reside in the operating system of the host computer system. Thus, the operating system traditionally executes instances of the transport protocols to perform the processes required to establish and manage virtual connections between peer applications running on the nodes of the network at the behest of those applications (layer 4). Further, the O/S executes instances of the network protocols to format/deformat payload data derived from the connected applications in preparation for transmitting/receiving the data over the network on behalf of the connected peer applications (layer 3).

Traditionally, data to be transmitted by the local application to the remote node over such a connection is first copied from an application buffer in the host memory to a temporary protocol buffer and it is this copy that is then formatted and transmitted by the protocol stack out over the network. Likewise, data received by the host over the network from the remote application is de-formatted and a copy of the data is then stored in a protocol buffer. An application buffer associated with the target application is then notified of the availability of the deformatted data, and is eventually copied into the application buffer in the host memory by the O/S at the request of the destination application.

The upper layer protocols (i.e. the network and transport layers) are typically independent of the lower layers (i.e. the data link and physical layers) by virtue of the hierarchical nature of the OSI. Examples of network layers include Internet Protocol (IP), the Internet Protocol eXchange (IPX), NetBEUI and the like. NetBEUI is short for NetBIOS Enhanced User Interface, and is an enhanced version of the NetBIOS protocol used by network operating systems such as LAN Manager, LAN Server, Windows® for Workgroups, Windows®95 and Windows NT®. Windows® and Windows NT® are registered trademarks of Microsoft Corporation. NetBEUI was originally designed by IBM for IBM's LAN Manager Server and later extended by Microsoft and Novell. TCP is a commonly deployed transport protocol involved in the establishment and management of virtual connections between peer applications as previously discussed. TCP/IP is a layer4/layer3 combination commonly used in Internet applications, or in intranet applications such as a local area network (LAN).

One of the most basic and widely implemented network types is the Local Area Network (LAN). In its simplest form, a LAN is a number of devices (e.g. computers, printers and other specialized peripherals) connected to one another by some form of signal transmission medium such as coaxial cable to facilitate direct peer-to-peer communication therebetween. A common network paradigm, often employed in LANs as well as other networks, is known as the client/server paradigm. This paradigm involves coupling one or more large computers (typically having very advanced processing and storage capabilities) known as servers to a number of smaller computers (such as desktops or workstations) and other peripheral devices shared by the computers known as clients.

Applications running on the client nodes send requests over the network to one or more servers to access service applications running on the server. These service applications facilitate operations such as centralized information storage and retrieval, database management and file transfer functions. Servers may also be used to provide centralized access to other networks and to various other services as are known to those of skill in the art. The applications running on the servers provide responses over the network to the clients in response to their applications' requests. These responses often involve large transfers of data. Clients and/or servers can also share access to peripheral resources, such as printers, scanners, and the like over the network.

More generally, a server can be deemed any processing node on the network that provides service applications to which applications running on other processing nodes may request connections, and a client can be deemed any processing node that is requesting such connections. It therefore follows that any processing node can be both a server and a client, depending upon its behavior at any moment. To establish a consistent point of reference for further discussions, a processing node henceforth will be deemed a server when listening for and accepting connections (i.e. acting as a connectee) and will be deemed a client when its applications are requesting connections to such applications on another node.

Network interface resources are typically required to physically couple computers and other devices to a network. These interface resources are sometimes referred to as network adapters or network interface cards (NICs). Each adapter or NIC has at least one bi-directional port through which a physical link can be provided between the network transmission medium and the processing resources of the network device. Data is communicated (as packets in the case of packet switched networks) between the virtually connected applications running on two or more network devices. The data is electronically transmitted and received through these interface resources and over the media used to physically couple the devices together. The network adapters typically provide the data link and physical layers of the interconnect standard. Adapter cards or NICs are commercially available in various product configurations that are designed to support one or more variations of standard architectures and known topologies.

Each of the network devices typically includes a bus system through which the processing resources of the network devices may be coupled to the NICs. The bus system is usually coupled to the pins of edge connectors defining sockets for expansion slots. The NICs are coupled to the bus system of the network device by plugging the NIC into the edge connector of the expansion slot. In this way, the processing resources of the network devices are in communication with any NICs or network adapter cards that are plugged into the expansion slots of that network device. As previously mentioned, each NIC or network adapter must be designed in accordance with the standards by which the network architecture and topology are defined to provide appropriate signal levels and impedances (i.e. the physical layer) to the network. This of course includes an appropriate physical connector for interfacing the NIC to the physical transmission medium employed for the network (e.g. coaxial cable, twisted-pair cable, fiber optic cable, etc.).

Each device on a network is identified by one or more "publicly" known addresses by which other devices on the network know to communicate with it. Each address corresponds to one of the layers of the OSI model and is embedded in the packets for both the source device that generated the packet as well as the destination device(s) for which the packet is intended. For Ethernet networks, a network device will use an address at layer 2 (the data link layer) known as a MAC (media access control) address to differentiate between the NICs and/or NIC ports included in the expansion slots of the network device. In addition, one or more protocol addresses at layer 3 (the network layer, e.g. IP, IPX, AppleTalk, etc.) known as a host number (for IP this is often referred to as an "IP address") are used to identify each of one or more instances of the network layer protocol(s) running on the device.

Each of the network devices can have multiple NICs/NIC ports, each of which can operate independently or that may be teamed as a single virtual NIC port. When operating individually, each NIC or NIC port is typically coupled to a separate network or sub-network, and each exposes an interface to the instance of IP (or other network protocol) that is part of the protocol stack residing in the O/S. Each exposed interface to the instance of IP is usually associated with its own IP address. Therefore devices having NICs coupled to different networks or sub-networks (i.e. residing in different domains) typically will be addressed using different host numbers within those different domains. Two or more NICs/NIC ports can be teamed together to aggregate resources, balance traffic over the team members and provide fault tolerance. In this case, an intermediate driver is implemented that makes the individual NIC drivers look like a single driver to a shared instance of IP. Thus, all members of a team share at least one IP address in a given domain. A single NIC/NIC port or a team of NICs/NIC ports can also be shared over two or more networks or sub-networks through a switch. Although this could be accomplished by interfacing multiple instances of IP to the single NIC/NIC port or team, a more secure method of doing this over an Ethernet network is to implement VLANs through a VLAN switch. Each VLAN assigned to the NIC or NIC team is interfaced to the single instance of IP through a virtual interface for that VLAN.

Each NIC or NIC port is associated with its own MAC address and devices on an Ethernet network communicate directly by first resolving IP addresses to MAC addresses. Thus, the MAC address can be thought of as being assigned to uniquely identify the physical hardware of the device (i.e. each adapter or NIC port providing a link to the network has its own MAC address) whereas the host number is assigned to an instance of the network protocol software of the host device. For a team of two or more NICs/NIC ports, the team's shared IP address is always resolved to a single MAC address on the network side so that it looks like a single virtual interface to other devices on the network. This team MAC address can be any one of the MAC addresses associated with one of the individual team members. On the transmit side, the packets generated by the local applications can be resolved to any one of the members of the team to achieve load balancing of outgoing traffic. This is known as transmit load balancing (TLB). On the receive side, the team IP address is always resolved to the team MAC address and thus all traffic is received by the NIC port having the team MAC address as its own.

As described above, devices coupled over Ethernet® networks by network adapters communicate (i.e. route packets between them) using their respective MAC (i.e. layer 2) addresses which identify particular NICs or NIC ports. This is true even though the applications running on such network devices initiate communication (i.e. establish a connection) between one another by specifying the public host numbers (or IP addresses) of those nodes rather than MAC addresses associated with particular NICs/NIC ports. This requires that Ethernet® devices first ascertain the MAC address corresponding to the particular IP address identifying the destination device. For the IP protocol, this is accomplished by first consulting a cache of MAC address/host number pairs maintained by each network device. If an entry for a particular host number is not there, a process is initiated whereby the sending device broadcasts a request to all devices on the network for the device identified by the destination host number to send back the MAC address for the NIC port connecting the device to the network or subnet. This process is known as ARP (Address Resolution Protocol), the result of which is then stored in the cache.

The ARP packets that form the request are formed by embedding the source and destination MAC addresses, which are at least 48 bits, as well as embedding the source and destination host numbers in the payload of the packet so that the receiving device knows to which device to respond. Thus, in the example case where a single NIC exposes three interfaces with the instance of the IP protocol residing in the operating system, the ARP process resolves all three IP addresses to the same MAC address. In the case of a team of NICs sharing an IP address, only one MAC address (the team MAC address) is used for a team when responding to an ARP request. Once the packets are received by the one of the NICs designated by the destination MAC address of the packets (either a single independent NIC or the one designated to receive packets on behalf of a team) the packets are provided to the appropriate interface to the instance of IP based on the destination IP address. To load balance received packets, a network switch must be used that implements a load balancing algorithm by which it distributes the received packets to each of the team members even though they all contain the same destination MAC address. This is accomplished when the switch actually changes the destination MAC address for a packet to target a particular NIC of the team, and can therefore do so for all for all of the packets destined for the team in a manner which distributes the packet traffic across the entire team. For the IPX protocol, the ARP process is not required because the MAC address is a constituent of the IP address.

There are three types of layer 3 addresses. A directed or unicast packet includes a specific destination address that corresponds to a single network device. A multicast address corresponds to a plurality of devices on a network, but not all of them. A broadcast address, used in the ARP process for example, corresponds to all of the devices on the network. A broadcast bit is set for broadcast packets, where the destination address is all ones (1's). A multicast bit in the destination address is set for multicast packets. These source and destination addresses are derived based on the establishment of peer-to-peer virtual connections established between applications running on different network devices are defined by two (e.g. local and remote) endpoints. For example, each endpoint identifies a particular instance of TCP/IP via the public host number corresponding thereto, and a port number associated with each of the applications between which the connection is made. This transport address information (i.e. host #, port #) defining each endpoint becomes the source and destination tuple or transport address within each packet transmitted over that connection. As a point of reference, the transport address for the server node is referred to herein as the destination transport address and the transport address for the client node is referred to as the source transport address.

Typically, a service type application running on a local processing node must first establish the fact that it is running and is ready to accept connections with peer applications running on remote processing nodes of the network. This process is sometimes referred to as establishing a listening socket at the transport layer (e.g. TCP). This listening socket specifies a transport address that includes a host number or public IP address by which the local node is identified on the network and a port number that identifies the listening application uniquely from other applications running on the node. A remote node wishing to access this application as a client will typically first establish a connecting socket of its own at its TCP layer. The connecting socket is a transport address that includes a host number or public IP address that identifies the client node on the network and a port number uniquely identifying the peer application seeking the connection. The client node then sends a request over the network to the server node to establish a connection between the requesting peer and the listening application specifying the connecting and listening sockets as endpoints for the connection. The connection is then established through an acknowledgement process after which packets may be exchanged between the applications with each packet specifying the server and client transport addresses as source and destination endpoints.

There is an ever-increasing demand for maximum network performance and availability. The advent of applications such as clustered database servers and clustered applications servers requires more and more data to be handled by the servers, including the sharing of large amounts of data among the processing nodes of the cluster. Such applications have motivated computer system developers to team or aggregate network interface resources such as NICs/NIC ports both to increase the data throughput rate at the network interface as well as to provide fault tolerance for improved system availability. For a description of techniques used in support of NIC teaming to achieve increased throughput and/or fault tolerance, see for example U.S. Pat. No. 6,272,113 entitled "Network Controller System that uses Multicast Heartbeat Packets," which was issued on Aug. 7, 2001.

Although the teaming of network resources has led to increased data throughput at the network interface, and the ever-increasing level of Central Processor Unit (CPU) performance has improved network device performance, their overall impact on network performance has been tempered by the fact that these improvements have significantly outpaced improvements in memory access speed, which has become the predominant limiting factor. Additionally, an ever-increasing percentage of CPU processing capacity is now being devoted to processing network I/O. As previously mentioned, this processing includes both packet formatting/de-formatting operations as well as data copying operations. Thus, as the amount of data to be transferred keeps increasing, the positive impact of processor performance and network interface throughput is limited because the numbers of these copy operations and their requisite demand on memory bandwidth increases commensurately.

One general approach to alleviating the memory bandwidth bottleneck and the ever-increasing demand placed generally on the processing resources of the host CPU is to establish connections that bypass the traditional protocol stack (sometimes referred to herein as the O/S protocol stack) residing in the O/S. Instead, connections are established over a bypass protocol stack residing outside of the host operating system and these offloaded connections facilitate direct placement of data between buffer memory of server and client nodes over the network. Connections that bypass the O/S based protocol stack eliminate the need for the aforementioned copying operations and also offload from the CPU the processing overhead normally associated with the formatting and de-formatting of such transactions. These offloaded connections permit the CPU of the computer system to apply freed up processing capacity to service applications and users.

One example of a set of technologies that has been developed to facilitate this technique of providing offloaded connections is often referred to generally as Remote Direct Memory Access (RDMA) over TCP/IP. Other technologies such as InfiniBand® typically have been proposed and implemented to accomplish direct data placement (DDP) using a network infrastructure that is not compatible with the existing (and widely deployed) network infrastructures such as TCP/IP over Ethernet.

Recently, the RDMA Consortium has been overseeing the development of standards by which RDMA may be implemented using TCP/IP as the upper layer protocol over Ethernet as the data link and physical layer. Various specifications for RDMA standards established by the RDMA Consortium are publicly available at www.rdmaconsortium.org. One of these technologies is a transport protocol called Sockets Direct Protocol (SDP) that extends the functionality of Sockets APIs to facilitate the establishment of both conventional TCP/IP connections as well as offloaded DDP connections. SDP emulates the semantics typically used in legacy applications written to use Sockets APIs over TCP in multiple O/S environments and therefore executes its functionality transparently with respect to legacy applications. Another such extension to Sockets API functionality is a precursor to SDP called Windows Sockets Direct (WSD) protocol, which is only available on the Windows Operating System. SDP and WSD permit legacy Sockets applications to use standard Sockets APIs such as listen, connect and accept to transparently establish offloaded connections when such connections are supported by both connecting endpoint processing nodes.

SDP and WSD are essentially libraries that intercept standard Sockets APIs and execute extended processes in response thereto to establish those offloaded connections in a manner transparent to the legacy applications. Thus, such protocol extensions enable legacy applications that speak Sockets to unwittingly set up RDMA connections between those applications when both connecting devices are configured to support them. If RDMA connections are not supported by both of the connecting nodes, the connections established between the applications running on those nodes simply default to the traditional connections established through the O/S protocol stack.

Physical connectivity to the network for offloaded connections (e.g. RDMA) is typically accomplished through a specialized network interface card often referred to as an RNIC. Each RNIC has its own protocol stack that includes its own instantiations of the upper layer protocols (e.g. TCP/IP), as well as the link layer and the physical layer for providing a physical RDMA link to the network. For an RNIC, direct data placement (DDP) protocols reside above the traditional upper layer protocols. The DDP protocols add placement information to outgoing packets over an offloaded connection to provide the RNIC at the receiving node with buffer name and location information for direct placement of the data into its buffer memory. In this way, the copy operations traditionally performed by the O/S are avoided because data is taken directly from a defined point in the application buffer for one peer application, is transmitted over the network, and then is directly placed at a defined point into the application buffer of another peer application. Likewise, the DDP protocols at the receiving end of an offloaded connection decode the placement information for direct data placement. Each RNIC also maintains connection state information for each connection established through it that facilitates communication with the user space and coordinates transfer of the data to the application that is the target of the directly placed data, and also coordinates transfer of data from the source application to be transmitted out over the network as well.

When an RNIC is used as a bypass stack through which offloaded connections may be established, the RNIC (i.e. the bypass stack) must somehow be differentiated from the conventional NIC(s) providing the traditional O/S stack (e.g. TCP/IP) connections over the network. Put another way, the lower level protocols of the RNIC must be able to differentiate between packets destined for direct data placement from those intended for conventional connections through the O/S. One solution that has been employed to differentiate between packets destined for one of the two stacks is a port mapping technique that associates with each application two port numbers, one for purposes of establishing an endpoint for a connection over the O/S stack and a second one mapped from the first for establishing an endpoint for a connection over the bypass stack. Thus, the transport address used to establish the endpoints for an offloaded connection to a particular application employs one of the public IP addresses along with the second port number to identify each client and server application so connected. Those of skill in the art will recognize that this port mapping will not be required in any situation in which there is only one stack, including where there is only an offloaded stack provided by an RNIC.

In the past, if more than one RNIC is employed at a processing node that has both an O/S and a bypass stack, each RNIC is coupled to a different network or sub-network and therefore the IP address used to contact the node publicly over each of those networks will be different. Under this scenario, the second port number is still sufficient to differentiate between the two types of connections for each network or sub-network because the local endpoints used to define those connections have different IP addresses even though they have the same second port numbers.

Of course, the offload capacity of a single RNIC may be limited to a certain number of RDMA connections based on the available resources of the particular RNIC. Moreover, RNICs can fail just as conventional NICs can. Thus, the same motivations exist for teaming or aggregating the connection capacities for two or more RNIC resources as those for aggregating the resources of standard NICs: the desire to increase the throughput of the computer system at the RDMA network interface and/or to provide fault tolerance to improve system availability. Of course, balancing the connections over the team of RNICs is desirable, just as it is desirable to balance data traffic over teams of standard NICs.

Teaming or aggregating RNICs, however, cannot be accomplished in the manner heretofore used for standard (sometimes referred to as "dumb") Ethernet NICs. As previously discussed, standard Ethernet NICs that are teamed share the same instance(s) of IP residing in the O/S. In traditional NIC teaming, the shared instance of IP in the O/S handles packets received and/or transmitted through all members of the team; the instance of IP is oblivious as to which of the team members receives or transmits a particular packet (the MAC addresses are not presented to the IP layer of the stack). To the instance(s) of TCP and IP residing in the operating system, the team of NICs looks like one virtual NIC through an interposed teaming driver that makes the individual drivers of the team appear as a single virtual NIC driver to the shared instances of TCP and IP. To the other processing nodes on the network, the team of NICs looks like a single virtual NIC because it is addressed through that shared IP address.

This approach is not applicable for aggregating RNICs because an RNIC must maintain the states of all of the connections it is handling. This is necessitated by the fact that connection state for conventional connections are maintained within the operating system. The O/S handles the process by which data is transferred from the kernel to the specific applications in the user space. Because each RNIC connection is bypassing the O/S, that state information must be maintained locally for each RNIC. This requires that any packets traveling over an established offloaded connection must always traverse the same pair of RNICs at the two connecting nodes from establishment to dissolution of the connection. Otherwise, the data received will have no context by which to get it to the right application. Thus aggregation of a plurality of RNICs as one virtual RNIC requires that each RNIC in the team be differentiated from one another because they do not share instances of TCP/IP and connection state in the manner that traditional (dumb) NICs do.

SUMMARY OF THE INVENTION

An embodiment of a method of aggregating a plurality of network resources of a computer system is disclosed where the network resources form part of a bypass protocol stack operable to provide offloaded connections over a network to instances of one or more applications running on the system. Each of the one or more applications is uniquely associated with a first port number and the system is identified on the network by one or more public IP addresses. In an embodiment, private IP addresses are assigned to uniquely identify each of the plurality of network resources. A listening socket is created for each one of the plurality of applications, where the listening socket is associated with a first endpoint tuple that includes one of the one or more public IP addresses and the first port number associated with the application. The first endpoint tuple is translated to a set of bypass endpoint tuples, each of the set of bypass endpoint tuples comprising a different one of the assigned private IP addresses and available for use as a destination transport address for an offloaded connection.

BRIEF DESCRIPTION OF THE DRAWINGS

For a detailed description of embodiments of the invention, reference will now be made to the accompanying drawings in which.

DETAILED DESCRIPTION

Notation and Nomenclature

Certain terms are used throughout the following description and in the claims to refer to particular features, apparatus, procedures, processes and actions resulting there from. For example, the term network resources is used to generally denote network interface hardware such as network interface cards (NICs and RNICs) and other forms of network adapters known to those of skill in the art. Moreover, the terms NIC and RNIC or network adapter may refer to one piece of hardware having one port or several ports. Those skilled in the art may refer to an apparatus, procedure, process, result or a feature thereof by different names. This document does not intend to distinguish between components, procedures or results that differ in name but not function. In the following discussion and in the claims, the terms "including" and "comprising" are used in an open-ended fashion, and thus should be interpreted to mean "including, but not limited to . . . ."

The following discussion is directed to various embodiments of the invention. Although one or more of these embodiments may be preferred, the embodiments disclosed should not be interpreted as, or otherwise be used for limiting the scope of the disclosure, including the claims, unless otherwise expressly specified herein. In addition, one skilled in the art will understand that the following description has broad application, and the discussion of any particular embodiment is meant only to be exemplary of that embodiment, and not intended to limit the scope of the disclosure, including the claims, to that embodiment. For example, while the various embodiments may employ one type of network architecture, operating system and/or topology, those of skill in the art will recognize that the invention(s) disclosed herein may be readily applied to all other compatible network architectures and topologies.

Figure 1:
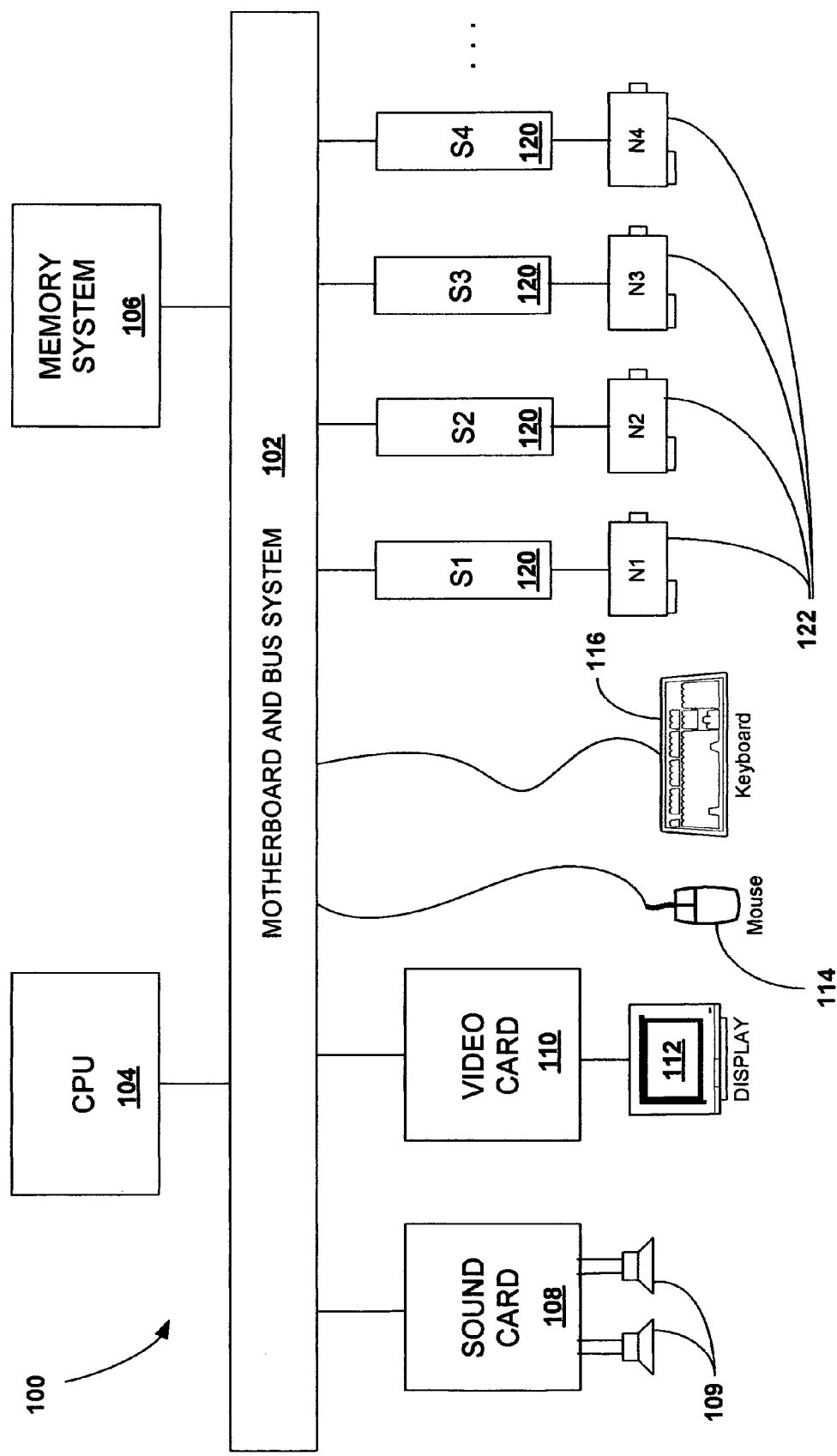
FIG. 1 is a block diagram that illustrates various features of a computer system, including some features that may be utilized to couple the computer system to a network in accordance with an embodiment of the present invention.

FIG. 1 is a block diagram of a computer system 100 that illustrates various features of the computer system 100, including some of those features used to couple it to a network in accordance with an embodiment of the present invention. The computer system 100 can be an IBM-compatible, personal computer (PC) system or the like, and may include a motherboard and bus system 102 coupled to at least one central processing unit (CPU) 104, a memory system 106, a video card 110 or the like, a mouse 114 and a keyboard 116. The motherboard and bus system 102 can be any kind of bus system configuration, such as any combination of the following: a host bus, one or more peripheral component interconnect (PCI) buses, an industry standard architecture (ISA) bus, an extended ISA (EISA) bus, a microchannel architecture (MCA) bus, etc. Also included but not shown are bus driver circuits and bridge interfaces, etc., as are known to those skilled in the art.

The CPU 104 can be any one of several types of microprocessors and can include supporting external circuitry typically used in PCs. The types of microprocessors may include the 80486, Pentium®, Pentium II®, etc. all microprocessors from Intel Corp., or other similar types of microprocessors such as the K6® microprocessor by Advanced Micro Devices. Pentium® is a registered trademark of Intel Corporation and K6® is a registered trademark of Advanced Micro Devices, Inc. The external circuitry can include one or more external caches (e.g. a level two (L2) cache or the like (not shown)). The memory system 106 may include a memory controller or the like and may be implemented with one or more memory boards (not shown) plugged into compatible memory slots on the motherboard, although any memory configuration is contemplated. The CPU 104 may also be a plurality of such processors operating in parallel.

Other components, devices and circuitry may also be included in the computer system 100 that are not particularly relevant to embodiments of the present invention and are therefore not shown for purposes of simplicity. Such other components, devices and circuitry are typically coupled to the motherboard and bus system 102. The other components, devices and circuitry may include an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Although the present invention is illustrated with an IBM-compatible type PC system, it is understood that the present invention is applicable to other types of computer systems and processors as known to those skilled in the art.

The computer system 100 may further include one or more output devices, such as speakers 109 coupled to the motherboard and bus system 102 via an appropriate sound card 108, and monitor or display 112 coupled to the motherboard and bus system 102 via an appropriate video card 110. One or more input devices may also be provided such as a mouse 114 and keyboard 116, each coupled to the motherboard and bus system 102 via appropriate controllers (not shown) as is known to those skilled in the art. Other input and output devices may also be included, such as one or more disk drives including floppy and hard disk drives, one or more CD-ROMs, as well as other types of input devices including a microphone, joystick, pointing device, etc. The input and output devices enable interaction with a user of the computer system 100 for purposes of configuration, as further described below.

The motherboard and bus system 102 are typically implemented with one or more expansion slots 120, individually labeled S1, S2, S3, S4 and so on, where each of the slots 120 is operable to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 100 may include one or more of several different types of buses and slots known to those of skill in the art, such as PCI, ISA, EISA, MCA, etc. In an embodiment illustrated in FIG. 1, each of a plurality of NIC adapter cards 122, individually labeled N1, N2, N3 and N4 is shown coupled to the respective slots S1-S4. The bus, implemented for slots 120 and the NICs 122, is typically dictated by the design of the adapter card itself As described more fully below, each of the NICs 122 enables the computer system to communicate through at least one port with other devices on a network or sub-network to which the NIC ports are coupled. The computer system 100 may be coupled to at least as many networks or sub-networks as there are NICs (or NIC ports) 122. When multiple NICs or NIC ports 122 are coupled to the same network or sub-network as a team, each provides a separate and redundant link to that same network or sub-network for purposes of load balancing, aggregated resources and/or fault tolerance. When NICs or NIC ports are coupled to different networks or sub-networks, they are each typically interfaced to their own instances of upper layer protocols (e.g. TCP/IP for Ethernet) residing in the O/S of system 100. When the NICs are teamed together, the team is typically interfaced to a singled instance of TCP/IP as if the team were a single virtual NIC.

Some of the NICs 122 may be dumb NICs; one or more instances of the upper layer protocols are resident in the host operating system and can be shared between the NICs when teamed, making the instance(s) of the upper layer protocols independent of the NICs themselves. One or more of the NICs 122 may also be an RNIC, which is commercially available and is designed to support offloaded connections that bypass the host operating system (O/S) and the instances of the upper layer protocols resident therein. Separate instances of the upper layer protocols are instead implemented within each one of the RNICs itself Some commercially available NICs actually have the ability to process both types of connections, and share a hybrid physical port and then provide two paths for processing the packets, depending upon whether they are streaming or offloaded packets.

As previously discussed, the continuously increasing amount of data being transferred over networks between peers in various network applications and its attendant demand on the host processor and memory bus has led to the implementation of techniques to offload protocol processing and memory access operations from the host O/S, particularly for transactions involving large data transfers. One such technology is RDMA. The challenge has been to provide offloaded connections while leveraging existing protocols and hardware infrastructure, as well as to remain backwards compatible with legacy applications to simplify the implementation and adoption of the offloaded technologies (e.g. RDMA). To this end, specialized NICs (typically referred to as RNICs) have been developed to support memory data transfers directly between local and remote application buffers over standard network physical layers such as Ethernet. Further, extensions to the standard application programming interfaces such as Sockets have been developed by which the system can facilitate both types of connections to the same applications.

Figure 2:
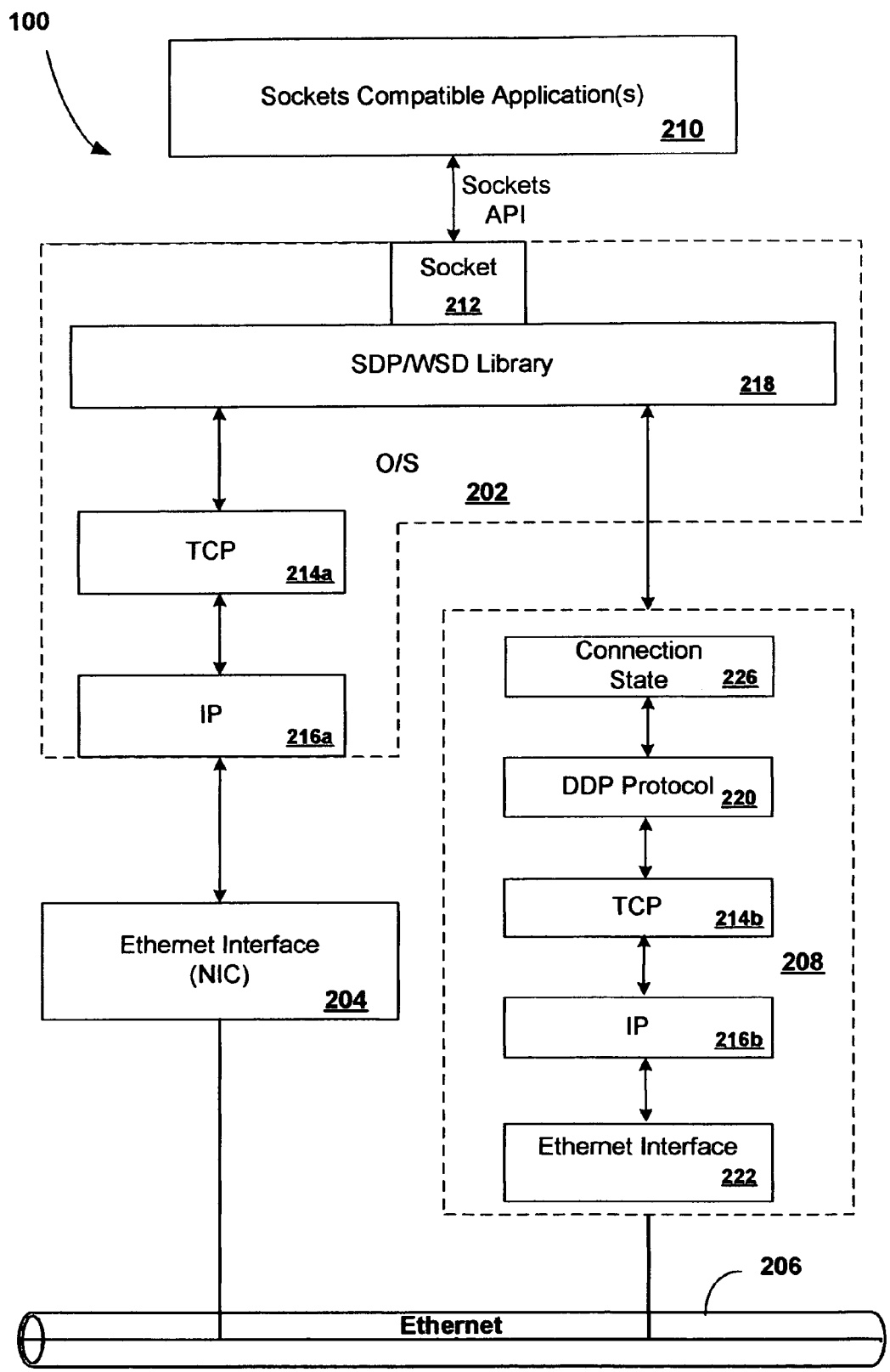
FIG. 2 is a conceptual representation of the computer system of FIG. 1 configured to support both conventional Ethernet connections as well as offloaded connections.

FIG. 2 illustrates a conceptual representation of a computer system 100 (such as the one illustrated in FIG. 1), configured in a manner known to those of skill in the art to support both conventional Ethernet connections (e.g. TCP/IP) as well as offloaded (e.g. RDMA/DDP) connections over a network. The connections of both types are established between application programs/services 210 running on system 100 (the local processing node) and applications running on remote client processing nodes (not shown, but configured similarly to the system 100 as shown) requesting such connections.

Data transmitted between the local service applications 210 of server node 100 and remote client applications over conventional network connections (e.g. TCP/IP) is addressed to and processed by the instances of TCP 214a and IP 216a running in conjunction with the host operating system (O/S) 202 and interfaced with conventional or "dumb" Ethernet NIC 204. This is sometimes referred to herein as the O/S stack. This processing includes the formatting into packets of data to be transmitted to the remote application through the data link and physical layers implemented by the Ethernet NIC 204, and the de-formatting of packet data received through NIC 204. As previously discussed, this processing also requires that a kernel copy of the application data that is to be transmitted be made first for purposes of network protocol processing (i.e. data formatting/deformatting), or for local application retrieval once processing is completed for received data. The application then enlists the help of the O/S 202 in writing the de-formatted data into the application buffer memory from the protocol buffer based on connection state maintained by the O/S for all such connections. Thus, these additional copying processes must all be performed by the host O/S 202 in addition to its duties of protocol processing, execution of the applications and the servicing of users. Obviously, the more data intensive the transactions through this O/S stack, the more O/S and hardware resources are consumed simply to transmit and receive data from the network.

System 100 as illustrated in FIG. 2 is configured to combine the well-known technique of establishing connections through the O/S stack with a technique for establishing offloaded RDMA connections through a bypass stack that is largely contained within RNIC 208. RNIC 208 is a modified network interface card that has been designed to provide system 100 with the network functional layers 1-4, including its own instances of upper layer protocols TCP 214b and IP 216b, which perform the same packet formatting/de-formatting functions otherwise performed by the instances of those upper layer protocols resident in the host O/S (214a, 216a). Of course, RNIC 208 also provides the layers 2 (link) and 1 (physical) of the OSI as does the conventional NIC 204. As previously mentioned, RNIC 208 and NIC 204 can be integrated into a single adapter card that shares a common physical layer. This shared physical port between the two types of adapters is sometimes referred to as a hybrid port, whereas if the RNICs and NICs have separate physical ports, these ports may be referred to as non-hybrid. The present invention as disclosed herein operates in substantially the same manner for either hybrid or non-hybrid ports.

On top of the TCP layer 214b, the direct data placement (DDP) protocols 220 attach buffer placement information to outgoing data that indicates application buffer names and locations for purposes of transferring data directly from the client node buffer memory (not shown) of the client application to a desired location in the server application buffer (not shown) of the server application 210. Likewise, data received from a remote application includes DDP placement information. The DDP protocols 220 are used to encode the information attached to the outgoing data packets (and also to decode that information for incoming data packets) for purposes of identifying source and destination memory buffers and locations between the connected nodes. An additional protocol sits atop the DDP protocols, which maintains connection state 226 and facilitates the transfer of received data to and from the user domain of the system 100 (i.e. the domain in which the applications 210 reside) at both ends of the offloaded connection. One such connection state protocol is known to those of skill in the art as Queue Pair Semantics. Maintaining the connection state within RNIC 208 for each connection established over RNIC 208 is required to substitute for the process typically performed within the host O/S 202 in facilitating the process of interfacing application data between the RNIC and the connected applications executing within the user domain.

As previously mentioned, one of the desirable features in such a design is to extend the functionality of system 100 to create offloaded connections transparently while ensuring backward compatibility for applications/services 210 that were written to employ a particular APL such as Sockets API. SDP/WSD 218 represents two libraries that have been developed to provide the extended functionality necessary to create offloaded connections, but this extended functionality is still initiated by the standard APIs and therefore transparently to the applications 210. Thus, they are designed to permit Sockets compatible applications 210 to operate as originally written while providing the option of establishing connections over one of two possible stacks without requiring modification of application legacy code.

In the absence of a bypass stack, the process of setting up conventional (e.g. TCP/IP) connections over a traditional O/S stack using Sockets typically begins with an application/service 210 running on system 100 establishing a TCP/IP "listening" socket 212 at a specified port number by calling the socket API to create the socket and then the listen API to make it a listening one. Establishing a listening socket for a particular application essentially involves associating a first or O/S endpoint tuple with the socket by binding one of the public IP addresses for system 100 with a predetermined first port number that uniquely identifies the particular requesting application 210 from other applications 210 running on the system. Establishing a listening socket essentially invites requests from peer applications running on remote client nodes of the network to attempt connections to the listening application 210 using the associated first or O/S endpoint tuple as the server endpoint for the connection. As previously mentioned, this endpoint is used as a destination transport address for the packets sent over the network to the server from a peer application running on some remote client node. The socket 212 acts in a conceptual sense as a conduit for data flow between the listening application 210 running in the user space and the protocols making up the traditional O/S protocol stack running in the kernel space of system 100.

For Sockets compatible applications, the predetermined first port numbers are sometimes referred to as "well-known" port numbers when they are standardized for some well-known applications. For example, application services FTP (File Transfer Protocol) and Telnet are commonly associated with well-known ports #21 and #22 respectively. Those of skill in the art will recognize that many other applications 210 do not have standardized or well-known port numbers but are nevertheless associated with first port numbers from a reserved space of first port numbers. In either case, this first endpoint tuple associated with the listening socket is publicly available to potential clients on the network.

When system 100 is equipped with a bypass stack as illustrated in FIG. 2, its instance of the SDP/WSD 218 intercepts the APIs to create a listening socket and in addition to the function of associating a first or O/S tuple with the socket, the library also generates and associates a bypass tuple with the same socket 212. This bypass tuple binds one of the public IP addresses of the server with a second port number that is mapped from the first port number. In this way, packets that are intended to flow through offloaded connections (and are therefore destined to be processed by the bypass stack) can be differentiated from those destined for the O/S side by the hardware of the two stacks. The practical effect of mapping the first port number to a second port number to create a bypass endpoint tuple for association with the listening socket is that the application is now in effect listening on both the traditional O/S stack as well as the bypass stack. A client or end-user application seeking a connection to the listening application 210 can initiate a connect API request specifying the first endpoint tuple for a connection over the O/S stack. If the connect is initiated over the client bypass stack, then the bypass stack may initiate a connect query specifying the first end-point tuple to obtain the bypass endpoint tuple from the server for a connection over the bypass stack.

System 100 could also be equipped with only the bypass stack. In this case, those of skill in the art will recognize that there is no need to map the first port number to a second port number for generating the bypass tuple, as there is no need to distinguish between stacks. Thus, in this case only a bypass tuple is generated and associated for each application 210 as it requests a listening socket and that bypass tuple can be simply the first port number in combination with the public IP address for the server. Of course, the first port number could still be mapped to a second port number as well.

When a peer application running on a remote client node wishes to connect to a listening application 210 such as FTP, the client node first creates a socket of its own and generates and associates with the socket a first endpoint tuple by binding one of its one or more public IP addresses with a first port number uniquely identifying the client peer application seeking the connection. If the client is itself equipped with a stack for processing offloaded connections, its instance of SDP/WSD also generates a bypass endpoint tuple that is associated with its newly created connect socket through which it will ultimately establish its end of the connection. Similar to the case for the server node, the bypass tuple includes the public IP address of the client and a second port number mapped from the first. Also similar to the case for the server node, the client will have a choice between two endpoint tuples through which to establish its end of the connection, depending upon whether it is to be a traditional connection or an offloaded connection. Those of skill in the art will appreciate that if the client has only an offloaded stack, that the mapping between port numbers is optional as only one tuple need be generated Typically, the client attempts by default to establish the connection as an offloaded one first. Thus, as part of the functionality provided by the client's instance of SDP/WSD, the client then issues a connection query over the network to the server instance of the library SDP/WSD 218. The destination transport address for this client issued connection query can specify the public IP address for the server and a port number designated for such queries. The connection query also specifies the first endpoint tuple that was associated with the listening socket 212 at the server when it was established for the application 210 (the application to which the client's application wishes to connect). The connection query is received over the server's O/S stack. In response to the connection query, the server instance of library 218 sends a response back to the client (over the O/S stack) that specifies the bypass endpoint tuple associated with the listening socket 212 for connecting to the application over the bypass stack. A request for connection is then issued by the client specifying the second server endpoint tuple as the destination transport address for the offloaded connection and the client bypass endpoint tuple as the source transport address for the offloaded connection. This request is received by RNIC 208 of the bypass stack. If the request for an offloaded connection can be accommodated by the server 100 (e.g. the RNIC 208 has sufficient resources) it calls the accept API to acknowledge the request to the client and to establish the connection. Of course, a local application/service 210 can also likewise initiate a connection with a remote listening socket where appropriate, and in this case the system 100 would now become the client node and the target node would be the server node in the transaction.

If the server system 100 is unable to accommodate the offloaded connection (e.g. RNIC 208 does not have sufficient resources currently to handle the connection), the server does not acknowledge the request and the client would be free to initiate a connection specifying the first endpoint tuple associated with socket 212 as the destination transport address for the connection and its first connect endpoint tuple as the source transport address for the connection. In this case, the connection is established over the traditional stack instead. In the case where either the client or the server is not equipped to provide offloaded connections (i.e. has no bypass stack), the client will either not send the request or the request will be ignored by the server and thus the connection will be established over the traditional stacks of the two nodes.

The mappings for the second port numbers used to establish all bypass endpoint tuples are typically maintained in a port map database and are mapped from the first or well-known port numbers such that no second port number is mapped from more than one first port number, nor does any second port number serve as a first port number. A first port map number may, under certain circumstances, be mapped to more than one second port number. The mapping between the first and second port numbers for each application 210 is typically assigned by the system 100 at the time that the TCP/IP socket 212 is created, and is then maintained until the first port number is released as a result of a closesocket request issued by the application for which the socket 212 was initially established.

Figure 3A:
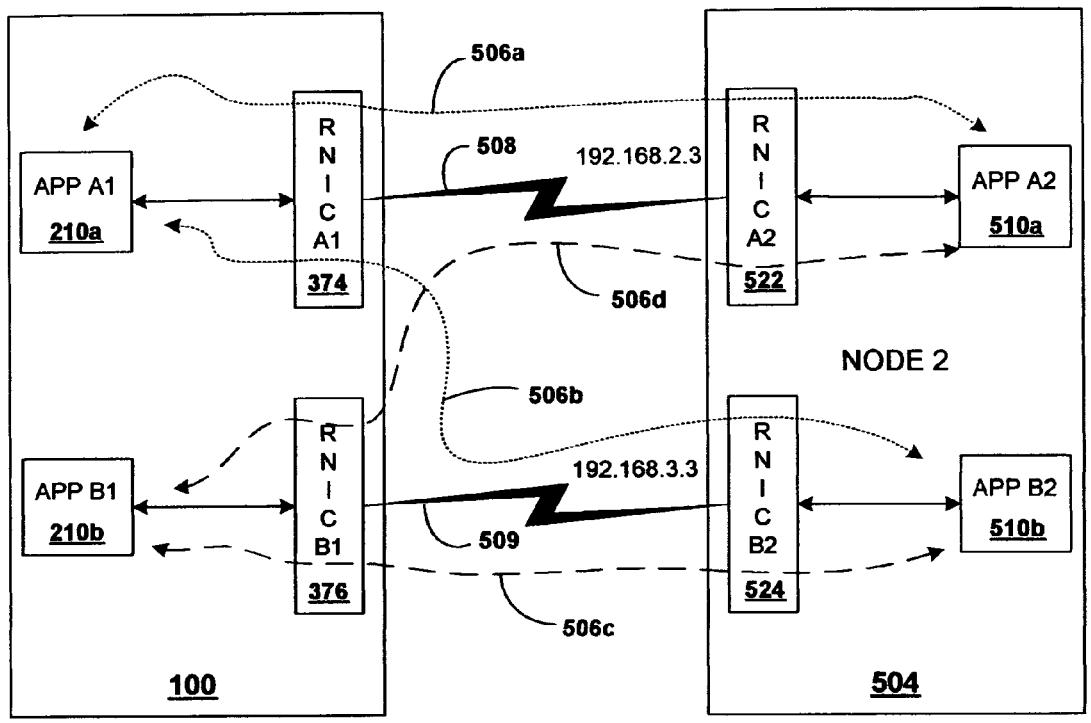
FIG. 3A is a block diagram illustrating a configuration of the computer system of FIG. 2 that includes two RNICs that are each initially coupled to one of two RNICs of a remote client node over separate sub-networks, but are not generally aggregated in accordance with an embodiment of the present invention.
Figure 3B:
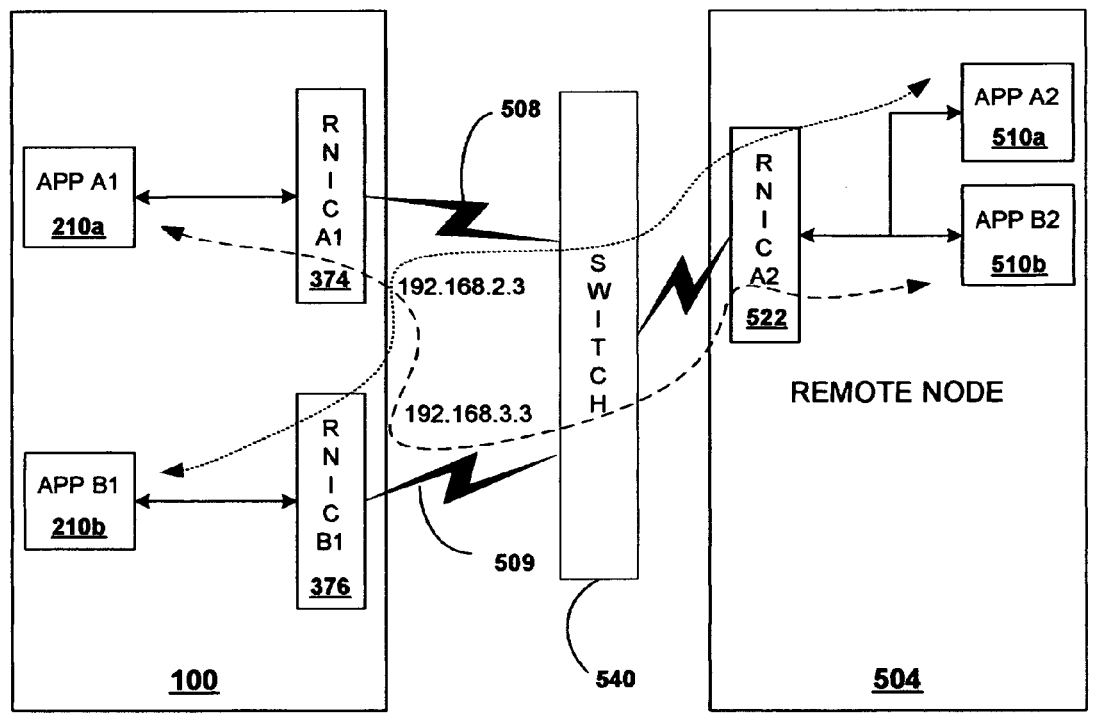
FIG. 3B is a block diagram illustrating a configuration of the computer system of FIG. 2 that includes two RNICs that are each coupled to one RNIC of a remote client node over separate sub-networks through a switch, but are not generally aggregated in accordance with an embodiment of the present invention.

As previously discussed, the same motivations exist for teaming or aggregating RNICs together as those for teaming conventional NICs. FIGS. 3A and 3B illustrate a possible implementation of a system using more than one RNIC, but this technique works only when each of the RNICs is separated on two different networks or sub-networks. In FIG. 3A, each pair of RNICs (i.e. RNIC A1 374/RNIC A2 522 and RNIC B1 376/RNIC B2 524) is coupled together over different IP subnets 508, 509 respectively. In this case, a given application (e.g. APP A1 210*a*) can listen on the bypass stack over both subnets by establishing individual listening sockets for each of the subnet IP addresses or establishing a wild-card listening socket that is good for both IP subnets. However, the applications (APP A2 510*a* and APP B2 510*b*) running on client 504 must be aware of the two different public server listen IP addresses and make a decision regarding over which subnet to establish the desired connection. This is especially true if a balancing of connections across the RNICs A1 210*a* and B1 210*b* is desired.

It is not desirable to require end-user applications running on clients to make such determinations. Moreover, such an arrangement makes any fault tolerance failover to a standby RNIC less efficient because each subnet would require its own standby rather than being able to provide one standby for the entire team. This is because performing a fail-over across separate subnets would not be practicable. It would also be preferable, for example, to be able to connect APP A1 210*a* to APP B2 510*b* over potential path 506*b* and APP A2 210*b* to APP B1 510*a* over potential path 506*d*. Put another way, it would be more advantageous for applications to connect over a single bypass stack made up of an aggregated plurality of RNICs coupled to the same network or subnet, rather than the applications connecting over a plurality of bypass stacks each having a single RNIC coupled to a separate network or subnet.

FIG. 3B illustrates a similar configuration where the remote client node 504 has only a single RNIC. In this case, switch 560 permits the single RNIC A2 522 to communicate with both RNIC A1 374 and RNIC B2 376 over the separate subnets. As in the example of FIG. 3A, the RNICs 374 and 376 are not generally aggregated and each must be accessed by the client applications using separate public IP addresses. As will be illustrated below, the desired general aggregation not accomplished through the examples of FIGS. 3A and 3B can be accomplished by establishing a team with RNICs A1 210*a* and B1 210*b* having a generally aggregated connection capacity that is the sum of the capacities of both RNICs and that is publicly addressed by a single IP address and is coupled to a single network or subnet.

Figure 4:
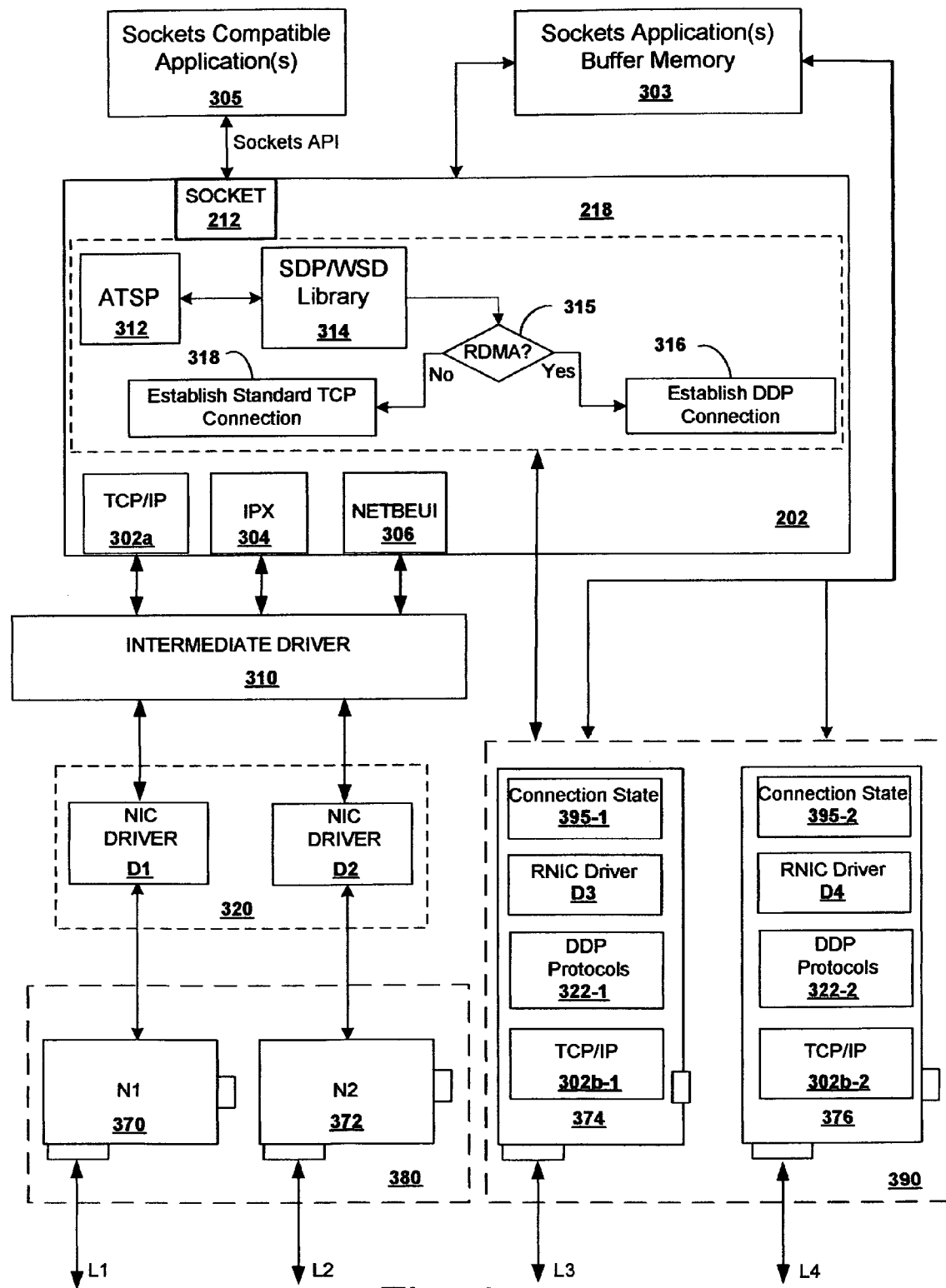
FIG. 4 is a block diagram illustrating a configuration of the computer system of FIG. 2 that has been expanded to include a team of conventional NICs and multiple RNICs aggregated in accordance with an embodiment of the invention.

In an embodiment as illustrated in FIG. 4, two conventional NICs 370, 372 are teamed together to form a single virtual NIC 380 having increased aggregate resources as well as possibly providing fault tolerance in the event one of the NICs fails. Such a teaming can also provide transmit load balancing of conventional TCP/IP traffic through implementation of well-known load balancing algorithms. The team 380 is established through the use of a software component called a teaming driver 310 that makes the two drivers D1-D2 appear to the instance of IP 302*a* as if they are really just one virtual driver 320. Thus, the TC/IP protocol layers 302*a* do not know that they are receiving and or transmitting packets over two distinct NICs as IP is itself a connectionless protocol.

As previously discussed a single RNIC 376 is typically not going to be able to support the number of simultaneous layer 4 connections to the network that might ultimately be desirable. Moreover, if the single RNIC fails, it could be desirable to provide a back-up (i.e. standby) RNIC for purposes of fault tolerance. Thus, for the same reasons it is desirable to team conventional NICs (load-balanced aggregation of resources and/or fault tolerance), it would also be desirable to team RNICs 374, 376 into a virtual aggregate RNIC 390 as well.

One of the difficulties in solving this aggregation problem is that each RNIC must maintain the unique connection state 395-1, 395-2 for each connection established over it. Each RNIC 374, 376 has an additional DDP protocol layer (322-1 and 322-2) that provides information regarding buffer name and location for direct placement of the packet data. The connection state 395-1, 395-2 is necessary for facilitating the actual transfer of this data directly to and from the target/source applications in the user space. Because this requires that the RNIC maintain the unique connection state information on a per connection basis, each connection must be established and maintained over the same pair of RNICs for the duration of the connection; packets for a given offloaded connection cannot be processed through just any member of an RNIC team as they can be for the team of dumb NICs 380. For the teamed NICS 380, the connection state for the O/S stack is maintained for all conventional connections in one place, the O/S 202.

Thus, the teaming process must be able to identify each individual RNIC so that the packets transmitted over a specific offloaded connection are received and processed only by that one RNIC of the aggregated team 390 that possesses the unique connection state for that offloaded connection. When there was only one RNIC coupled to a particular network or sub-network, the second mapped port number was sufficient to differentiate between the conventional packets and offloaded packets. For a team of RNICs, however, there must be a further differentiation of packet streams to identify for the hardware those connections being handled by a particular RNIC in an aggregation of such RNICs. As a result, any aggregation will be one of connections rather than of traffic generally.

In an embodiment of the present invention such as the one shown in FIG. 4, this general aggregation can be accomplished transparently to a network by first assigning private IP addresses (i.e. host numbers) to each RNIC to be aggregated as a team. These private IP addresses uniquely identify each of the RNICs of the team and can be used as part of the bypass endpoint tuple through which a client may connect to the server application 305 over the bypass stack. The team of RNICs is still preferably identified publicly to the network as a single entity with the same public IP address or host number that identifies the team of conventional NICs. The assigned private IP addresses (i.e. host numbers), however, should not be publicly known to the applications running on the nodes within the network or subnet to which the team of RNICs is coupled, nor should they be the same as any public IP addresses known to (i.e. exposed to) the server or client applications.

In an embodiment of the invention, a set of bypass endpoint tuples are generated and associated with each listening socket created for an application. Each tuple of the set includes one of the private IP addresses in the place of the public IP address of the prior art. In an embodiment that includes an O/S stack as well as a bypass stack, each of the bypass tuples also include a second port number that has been mapped from the first port number as in the prior art. In this way, each bypass tuple not only differentiates between the traditional O/S stack and the bypass stack, but also further differentiates between the individual RNICs aggregated to form the bypass stack. In an embodiment where there is only a bypass stack, the port number mapping is not required but the translation of the public IP address to the private IP addresses of each RNIC is still required.

Thus, this technique involves not just a port mapping as in the prior art, but an entire transport address translation that includes the port mapping as well as an address translation between the public host number for the local node (i.e. the team IP address) to each one of the assigned private IP addresses. An entirely new transport address is then made available to the client by which its application may seek to connect over the secondary stacks of the two nodes to the application listening on the server.

As previously described with reference to FIG. 2, there is already a connection query and mapping mechanism established for DDP schemes by which the server system maps a first port number to a second or RDMA port number for applications running on the server for the benefit of end-user applications running on a client system seeking an offloaded connection. The server provides that second port number to the client node in response to a connect query from the client application and the second port number is then specified by the client node in a connect request. Therefore, it would be advantageous to piggyback off of this known technique for the server to provide the transport address translation described above to the client node. Those of skill in the art will recognize that such an extension of the port mapping service previously employed in non-aggregated systems is not necessary to the invention, but is merely an embodiment that is convenient.

When a server node that is configured with an embodiment of the invention as illustrated in FIG. 4 wishes to establish a listening socket 212 for an application 305, the application 305 calls the Sockets listen API and the listening socket is created. The SDP/WSD library 314 intercepts that API and performs the traditional function of associating a first or O/S endpoint tuple with the socket 212 that can be used to establish a connection to the application 305 over the O/S stack. The O/S endpoint tuple is a transport address that includes the public IP address for the node as a host number and a first or well-known port number that is predetermined and associated with that application 305. In addition, library 314 performs the additional function of requesting a set of bypass endpoint tuples by which a connection to the application 305 may be established over the bypass or offloaded stack.

Thus, a set of bypass endpoint tuples is generated for each of the RNICs (e.g. RNICs 374, 376 of the team 390) for each application 305 that requests a listening socket. In an embodiment, the set of bypass tuples can be generated and maintained for each listening application 305 by an address translation service provider (ATSP) 312. ATSP 312 maintains the set of translated transport addresses for each listening application each of which includes a different one of the assigned private IP addresses. In an embodiment that includes an O/S as well as a bypass stack (such as that illustrated in FIG. 4), the set of translated transport addresses (i.e. bypass endpoint tuples) also includes a second port number mapped from the first port number originally associated with the particular application 305. In the case of an embodiment that only includes an offloaded stack; the port number can be simply the first port number as no port mapping is required as previously discussed. Each set of bypass endpoint tuples for a particular application 305 can be indexed by the first port number assigned to that application 305.

For a client node having an embodiment like that shown in FIG. 4, when one of its applications seeks to establish a connection that may be offloaded to a listening application 305 running on the server node (i.e. system 100), the ATSP running on the client node must first establish a connection socket for the client application seeking the connection. In an embodiment of the invention, much like the process as described above for the server node, the client node must establish both a first or O/S tuple and a bypass endpoint tuple by which a connection may be established over the O/S and aggregated bypass stacks of the client respectively. The first or O/S endpoint tuple can be created by binding a first port number uniquely representing the client application to the public IP address for the client node. The client's SDP/WSD library intercepts this API and performs the further function of requesting a bind between a second port number and one of the private IP addresses assigned to each of the active members of its own RNIC team. Of course, if the client has only one RNIC, then there can be only one potential client bypass tuple, which will be the same as the first tuple. Both of these tuples are then associated with the connect socket created for the requesting application.

It is not necessary for the client ATSP having a team of more than one RNIC to translate the first tuple to a set of tuples in a physical sense, one for each of the team of RNICs, as is done at the server when creating a listening socket. A selection from a set of bypass tuples is still made, but the selection can be made from a potential set at a time prior to issuing the connect request to the server. Moreover, while a second port number is assigned to the bypass tuple, a port mapping is typically not required provided that the second port number cannot be chosen from port numbers previously assigned as a first or second port number. Thus, a connection balancing policy running on the client node could choose a bypass tuple from the set of potential bypass tuples based on the same or similar criteria as it uses to select from the set of server bypass tuples returned to it in response to a connect query. The bypass tuple generated by the foregoing process then becomes the source transport address defining the client endpoint for the offloaded connection.

The client's ATSP then sends a connection query over the network to the ATSP 312 of the server node system 100 that is received over and processed by the O/S stack over the team of NICs 380. The client connection query specifies the first endpoint tuple for the application 305 to which the client applications seeks a connection and is directed to a TCP listening socket on the O/S stack of server node 100 that has been established specifically to receive such queries from client ATSPs to the server ATSP 312. The server ATSP 312 receives the connection query with the specified first endpoint tuple and can access the stored set of translated transport addresses using the first port number as an index. The entire set of the possible destination transport addresses (in the form of the set of bypass endpoint tuples) for the application 305 are accessed, each of which includes the same mapped second port number for application 305 and one of the translated private IP addresses corresponding to one of the active RNICs of the team.

In an embodiment, the server node 100 then returns a response to the client's connection query that includes all of the set of possible destination transport addresses by which to connect to the application 305 (i.e. the set of bypass tuples in the form of the mapped second port number and all of the private IP addresses assigned to the active RNIC members of the server team). In this case, the client then can decide which of the set of bypass tuples (and thus over which of the RNICs of the team 390) to use as the destination transport address in establishing the connection. In an alternate embodiment, the choice of which transport address (and thus which RNIC 374, 376) over which to establish the connection is made by the server (e.g. system 100) and only the chosen destination transport address is returned to the client ATSP in response to the connection query. In either case, the client then issues a request for connection to the application 305 over the bypass stack specifying the chosen one of the set of server endpoint tuples as the translated destination transport address and further specifying which of the set of bypass endpoint tuples associated with the client connect socket was chosen by the client to be the translated source transport address for its end of the offloaded connection. This request is received over the particular RNIC 374, 376 of the server team 390 to which the private IP address of the selected destination transport address (and thus the selected server bypass endpoint tuple) is assigned. If the connection is accepted by the server system 100, the chosen RNIC 374, 376 of the server team returns to the client an acknowledgement that the connection has been accepted. The connection state 395-1, 395-2 (i.e. the source and destination transport addresses defining the connection) is stored in the chosen RNIC 374, 376 and the offloaded protocols 322-1, 322-2 are enabled for the connection. The two applications 305 continue to exchange data between their application buffers 303 using the DDP protocols over their respective bypass stacks (i.e. via the chosen RNICs) until the connection is terminated either by request or by a fault.

If between responding to the client connection query and accepting the connection request based on the selected bypass endpoint tuples the chosen RNIC at the server end no longer has the connection capacity necessary to accommodate the connection, the connection can be retried using a different one of the set of translated bypass endpoint tuples as the destination transport address. If the server 100 does not have offloaded capability, the server will simply not recognize the connection query from the client and the client and after some predetermined timeout for receiving a response can simply issue the request for connection over the O/S stack of the server using the first server endpoint tuple. If the client is not offloaded connection capable, it will not have the instance of the ATSP necessary to issue the connection query for the set of bypass endpoint tuples associated with the listening socket at the server and will simply request connection over the first or O/S stack using the first or O/S endpoint tuple.

This technique, as distinguished from the previously known non-aggregated case illustrated in FIG. 2, involves not just a port mapping from a first port number to a second, but an entire transport address translation that includes the second port number resulting from the port mapping process as well as an address translation between the public host number for the local node (i.e. the team IP address) and the set of the assigned private host numbers. Thus, a set of bypass endpoint tuples for the desired offloaded connection can be made available to the client as potential destination transport addresses by which it should seek to connect over the bypass stack of the server system 100. Likewise, the client can aggregate multiple resources and make a selection between possible bypass tuples representing each of its own aggregated RNICs.

Figure 5:
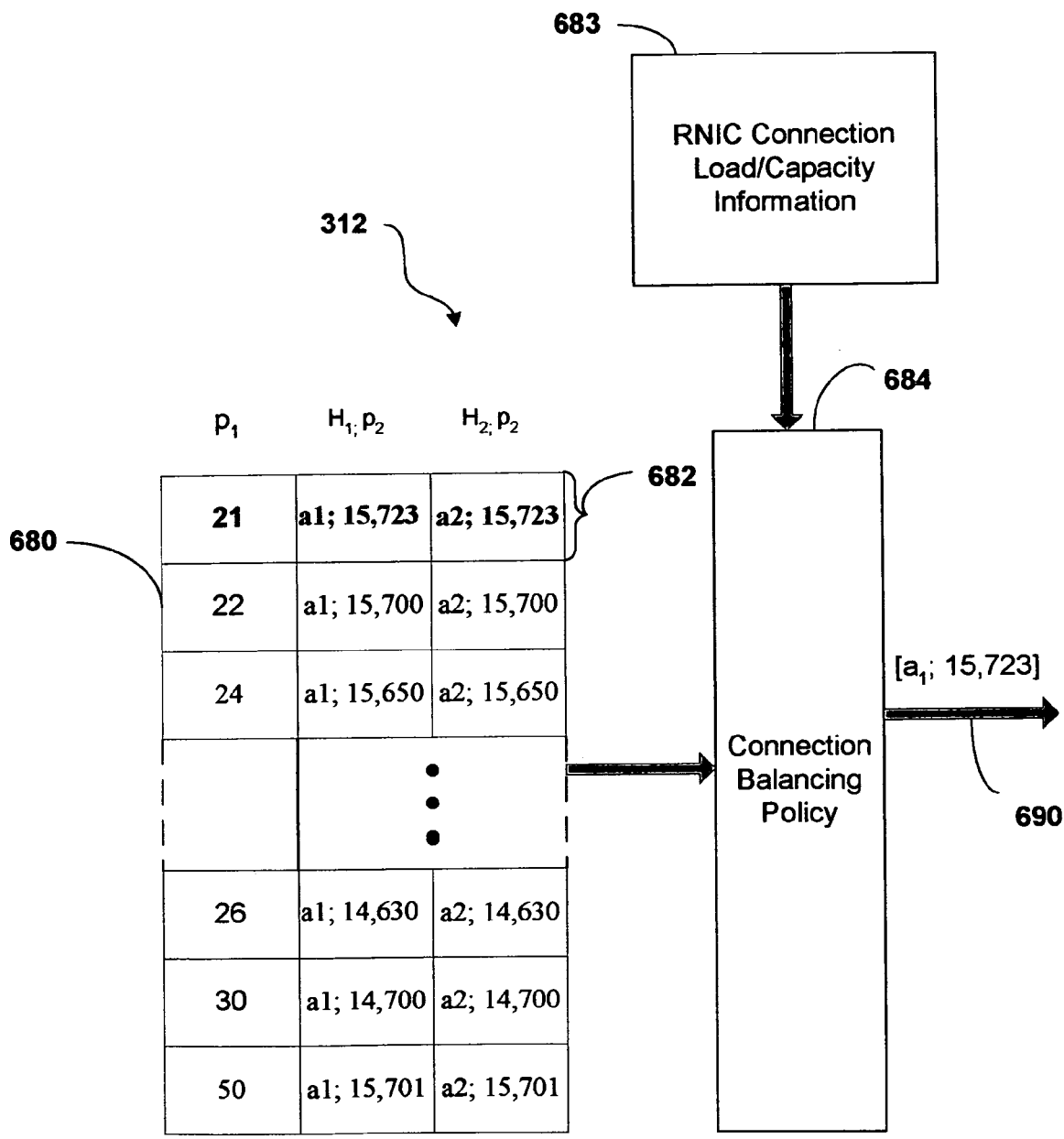
FIG. 5 is a conceptual representation of an address translation service provider (ATSP) having a port map that is indexed by a first port number to provide mapped and translated transport addresses for offloaded connections in accordance with an embodiment of the invention.

In an embodiment of an ATSP 312 illustrated in FIG. 5, the address translation map 680 of ATSP 312 is expanded to include a set of transport address entries 682, each entry containing a bypass endpoint tuple that can be used as a destination transport address for a connection to an application. Each entry includes a private host number assigned to and uniquely identifying one member of the RNIC team, as well as the second or RDMA port number mapped from the first port number uniquely associated with the service/application 305 to which the remote system seeks a connection. As previously mentioned, when the system 100 has only an offloaded stack made up of an aggregation of RNICs, the set of entries do not require a mapped second port number and thus may all share the first port number. When the first port number is used as an index to access the address translation map, all entries of the set indexed by that first port number can be accessed and a choice made between those entries to be used for the connection.

Thus, as an example with reference to the embodiment of FIG. 4, at the time a listening socket 212 is created for the FTP application for example, the O/S endpoint tuple associated with the listening socket for FTP will be the public IP address for system 100 and the well-known port #21. This first or O/S endpoint tuple is then translated to the set of available bypass endpoint tuples (all possible destination transport addresses for connections from client peer applications to FTP). The ATSP 312 will then create two entries in the address translation map for FTP, each having a bypass endpoint tuple/transport address (i.e. $H_1$; $p_2$ and $H_2$; $p_2$) that includes the private host number (i.e. $H_1$, $H_2$) assigned to each one of two RNICs 374 and 376, and the second port number ($p_2$) that is mapped from the first or well-known port #21 (i.e. $p_1$) originally associated with the FTP application. Thus, the ATSP 312 now has a choice of two possible bypass endpoint tuples 682 (corresponding to the two RNICs that make up the bypass stack) through which to establish bypass stack (i.e. offloaded) connectivity between a remote CP (connecting peer) application running on a client node seeking to communicate with the local AP (accepting peer) application service FTP.

The server instance of the ATSP 312 may notify the client instance of ATSP that it should connect to the service application (AP) 305 using either of the mapped pairs (i.e. endpoint tuples) 682, depending upon which of the two teamed RNICs is to be used. In an embodiment, the address translation map 680 of FIG. 5 could be implemented as, for example a content addressable memory or the software equivalent thereof, such as an associative table. Thus, when the ATSP 312 seeks the set of bypass endpoint tuples for FTP using port #21 as an index, it will receive as output the set of all bypass endpoint tuple entries 682 for that listening application.

As is disclosed in more detail in the related application entitled "Managing Connections through an Aggregation of Network Resources Providing Offloaded Connections between Applications over a Network," the ATSP 312 can also keep track of pertinent information such as the current loading and total capacity 683 of the RNICs of a team 390, and base its choice between RNICs (and thus its choice of which bypass endpoint tuple to use) based on this information using some connection balancing service 684. The output of load balancing service 684 (which is a selection of one of the set of translated bypass endpoint tuples) is then provided to the client node querying for this information as previously described. The client then issues its connect request using as the destination transport address the selected one of the bypass endpoint tuples provided to the client in response to its connection query and the connection is established using that endpoint over the desired RNIC. As is also disclosed in the above-referenced related application, the loading and capacity information and the connection balancing policy can be maintained by the client nodes rather than the server node. In this case, the set of all available destination transport addresses 682 (and thus all available private host numbers) are provided to the client ATSP by the server ATSP 312 and the client node can then make the determination as to which of the set of translated bypass endpoint tuple to use as the destination transport address for the connection based on some load-balancing policy running on the client.

Those of skill in the art will recognize that a further benefit of the foregoing novel and nonobvious extension of the RDMA port mapping concept and mechanism to perform public to private IP address translation (in addition to the previously existing port mapping process) to enable aggregation of RNICs places no limitation on the number of RNICs that may be teamed together in the manner just described.

What is claimed is:

1. A method of aggregating a plurality of network resources of a computer system, the network resources comprising a bypass protocol stack operable to provide offloaded connections over a network to instances of one or more applications running on the system, each of the one or more applications uniquely associated with a first port number and the system being identified on the network by a public IP address, said method comprising:
    assigning private IP addresses to uniquely identify each of the plurality of network resources; and
    creating a socket for each one of the plurality of applications, said creating comprising:
        associating the socket with a first endpoint tuple comprising the public IP address and the first port number associated with the application; and
        translating the first endpoint tuple for each socket to a set of bypass endpoint tuples, each of the set of bypass endpoint tuples comprising a different one of the assigned private IP addresses; and
        associating the socket with the set of translated bypass tuples; and
    maintaining the sets of bypass tuples for the created sockets as an address translation map.

2. The method of claim 1 further comprising establishing an offloaded connection to one of the applications over the bypass stack, the established connection defined by a transport address comprising a selected one of the set of bypass endpoint tuples associated with the socket created for the one of the applications.

3. The method of claim 1 wherein the system is a server, the socket created for each of the applications is a listening socket, and the transport address is a destination transport address.

4. The method of claim 2 wherein the system is a client, the socket created for each of the applications is a connecting socket, and the transport address is a source transport address.

5. The method of claim 2 wherein said establishing further comprises selecting the one of the set of bypass endpoint tuples to be used as the transport address for the offloaded connection based on a connection-balancing policy in view of current connection load and connection capacity information maintained for each of the plurality of network resources.

6. The method of claim 1 wherein:
    the system further comprises an O/S protocol stack for providing standard connections over the network to the one or more applications running on the system; and
    each of the set of bypass endpoint tuples associated with the socket created for one of the applications further comprises a second port number mapped from the first port number associated with that application.

7. The method of claim 6 further comprising establishing an offloaded connection to one of the applications over the bypass stack, the established connection defined by a transport address comprising a selected one of the set of bypass endpoint tuples associated with the socket created for the one of the applications.

8. The method of claim 7 wherein said establishing further comprises selecting the one of the set of bypass endpoint tuples to be used as the transport address based on a connection-balancing policy in view of current connection load and connection capacity information maintained for each of the plurality of network resources.

9. The method of claim 8 wherein each of the set of bypass endpoint tuples for each application are accessed from the address translation map using the first port number associated with the application as an index.

10. The method of claim 6 wherein said translating further comprises:
   accessing the set of bypass endpoint tuples for the specified one of the applications from the address translation map using the first port number associated therewith;
   selecting one of the accessed set of bypass endpoint tuples based on a connection-balancing policy implemented by the computer system; and
   defining the transport address of the offloaded connection using the selected bypass endpoint tuple.

11. The method of claim 10 further comprising maintaining current connection load and connection capacity information for each of the plurality of resources; and wherein the connection-balancing policy selects one of the accessed set of bypass endpoint tuples in view of the current connection load and connection capacity information.

12. The method of claim 6 further comprising establishing a connection to the specified application over the O/S protocol stack whenever none of the plurality of resources have sufficient capacity to accommodate the offloaded connection.

13. The method of claim 1 wherein said maintaining an address translation map and said translating are performed by an address translation service provider (ATSP) running on the system.

14. The method of claim 13 further comprising:
   receiving a connection query from a client node comprising a client ATSP, the connection query specifying the first endpoint tuple associated with the socket created for the application; and
   responding to the connection query with one or more of the set of bypass endpoint tuples translated from the specified first endpoint tuple and accessed from the address translation map.

15. The method of claim 14 wherein:
   said selecting is performed by a connection balancing service running on the system;
   the server ATSP transmits the response to the connection query to the client ATSP over the network; and
   the client sends a request for connection to the server over the network specifying the selected one of the set of bypass endpoint tuples as the transport address for the connection.

16. The method of claim 6 wherein the one or more applications are Sockets applications and the system comprises a Sockets Direct Protocol library.

17. The method of claim 6 wherein the one or more applications are Sockets applications and the system comprises a WinSock Direct Protocol library.

18. A method of aggregating connection capacity of a plurality of network resources of a computer system, each of the plurality of resources comprising a bypass protocol stack operable to provide a maximum number of offloaded connections over a network to one or more applications running the computer system, each of the one or more applications uniquely associated with a first port number, the computer system identified on the network by a public IP address, said method comprising:
   identifying each of the plurality of network resources with a unique private host number;
   creating a socket for each of the one or more applications, said creating comprising:
      associating a first endpoint tuple with each socket, the endpoint tuple comprising the public IP address identifying the system and the first port number associated with the application for which each socket is created; and
      translating the first endpoint tuple to a set of bypass endpoint tuples, each of the set comprising a different one of the private IP addresses; and
   establishing an offloaded connection to one of the applications through a selected one of the plurality of network resources, the offloaded connection defined by a transport address comprising the one of the set of bypass endpoint tuples translated from the first endpoint tuple associated with the socket created for the application that comprises the private IP address assigned to the selected one of the network resources.

19. The method of claim 18 wherein said establishing further comprises selecting the one of the plurality of resources based on a connection-balancing policy in view of current connection load and connection capacity information maintained for each of the plurality of network resources.

20. The method of claim 18 wherein:
   the system further comprises an O/S protocol stack for providing standard connections over the network to the one or more applications running on the system; and
   each of the set of bypass endpoint tuples translated from the first endpoint tuple associated with a socket created for one of the applications further comprises a second port number mapped from the first port number associated with that application.

21. The method of claim 18 wherein the system is a server, the socket created for each of the applications is a listening socket, and the transport address is a destination transport address.

22. The method of claim 18 wherein the system is a client, the socket created for each of the applications is a connecting socket, and the transport address is a source transport address.

23. The method of claim 19 further comprising maintaining an address translation map, the address translation map comprising the set of bypass endpoint tuples for each of the one or more applications, each of the set of bypass endpoint tuples comprising the mapped second port number for each of applications and a different one of the private IP addresses identifying each of the network resources.

24. The method of claim 23 wherein said establishing further comprises selecting the one of the set of bypass endpoint tuples translated from the first endpoint tuple associated with the application to which the connection is to be established comprising the private IP address identifying the selected network resource, said selecting based on a connection-balancing policy in view of the current connection load and connection capacity information maintained for each of the plurality of network resources.

25. The method of claim 20 wherein the first port number is a well-known port number.

26. The method of claim 25 wherein the applications are Sockets compatible.

27. The method of claim 26 wherein the system comprises a WSD library.

28. The method of claim 26 wherein the system comprises an SDP library.

29. A method of aggregating connection capacity of a plurality of network resources of a computer system, each of the plurality of resources operable to provide a maximum number of offloaded connections over a network to one or more applications running the system, the system further comprising an O/S protocol stack operable to provide conventional connections over the network to the one or more applications, each of the one or more applications uniquely associated with a first port number, the computer system identified on the network by a public IP address, said method comprising:

identifying each of the plurality of network resources with a unique private host number;

creating a socket for each of the applications, said creating comprising:

associating a first endpoint tuple with each socket, the endpoint tuple comprising the public IP address identifying the system and the first port number associated with the application for which each socket is created; and translating the first endpoint tuple to a set of bypass endpoint tuples, each of the set comprising a different one of the private IP addresses and a second port number mapped from the first port number associated with the application; and establishing an offloaded connection to one of the applications through a selected one of the plurality of network resources, the offloaded connection defined by a transport address comprising the one of the set of bypass endpoint tuples translated from the first endpoint tuple associated with the socket created for the application that comprises the private IP address assigned to the selected one of the network resources.

30. A computer system having an aggregated plurality of network resources, the network resources comprising a bypass protocol stack operable to provide offloaded connections over a network to instances of one or more applications running on the system, each of the one or more applications uniquely associated with a first port number and the system being identified on the network by a public IP address, said computer system comprising:

means for assigning private IP addresses to uniquely identify each of the plurality of network resources;

means for creating a socket for each one of the plurality of applications, said means for creating comprising:

means for associating the socket with a first endpoint tuple comprising one of the public IP address and the first port number associated with the application; and means for translating the first endpoint tuple for each socket to a set of bypass endpoint tuples, each of the set of bypass endpoint tuples comprising a different one of the assigned private IP addresses; and means for associating the socket with the set of translated bypass tuples; and means for maintaining the sets of bypass tuples for the created sockets as an address translation map.

31. The computer system of claim 30 further comprising means for establishing an offloaded connection to one of the applications over the bypass stack, the established connection defined by a transport address comprising a selected one of the set of bypass endpoint tuples translated from the first endpoint tuple associated with the socket created for the one of the applications.

32. The computer system of claim 30 wherein the system is a server, the socket created for each of the applications is a listening socket, and the transport address is a destination transport address.

33. The computer system of claim 31 wherein the system is a client, the socket created for each of the applications is a connecting socket, and the transport address is a source transport address.

34. The computer system of claim 31 wherein said means for establishing further comprises means for selecting the one of the set of bypass endpoint tuples to be used as the destination transport address for the offloaded connection based on a connection-balancing policy in view of current connection load and connection capacity information maintained for each of the plurality of network resources.

35. The computer system of claim 30 wherein:

the computer system further comprises an O/S protocol stack for providing standard connections over the network to the one or more applications running on the system; and each of the set of bypass endpoint tuples associated with the socket created for one of the applications further comprises a second port number mapped from the first port number associated with that application.

36. The computer system of claim 35 further comprising means for establishing an offloaded connection to one of the applications over the bypass stack, the established connection defined by a transport address comprising a selected one of the set of bypass endpoint tuples associated with the socket created for the one of the applications.

37. The computer system of claim 36 wherein said means for establishing further comprises means for selecting the one of the set of bypass endpoint tuples to be used as the transport address based on a connection-balancing policy in view of current connection load and connection capacity information maintained for each of the plurality of network resources.

38. The computer system of claim 37 wherein the set of bypass endpoint tuples for each application are accessed using the first port number associated with the application as an index.

39. The computer system of claim 35 wherein said means for translating further comprises:

means for accessing the set of bypass endpoint tuples for the specified one of the applications from the address translation map using the first port number associated therewith;

means for selecting one of the accessed set of bypass endpoint tuples based on a connection-balancing policy implemented by the computer system; and means for defining the transport address of the offloaded connection using the selected bypass endpoint tuple.

40. The computer system of claim 39 further comprising means for maintaining current connection load and connection capacity information for each of the plurality of resources; and wherein the connection-balancing policy selects one of the accessed set of bypass endpoint tuples in view of the current connection load and connection capacity information.

41. The computer system of claim 35 further comprising means for establishing a connection to the specified application over the O/S protocol stack whenever none of the plurality of resources has sufficient capacity to accommodate the offloaded connection.

42. The computer system of claim 7 wherein said means for maintaining an address translation map and said means for translating comprise an address translation service provider (ATSP) running on the system.

43. The computer system of claim 42 further comprising:

means for receiving a connection query from a client node comprising a client ATSP, the connection query specifying the first endpoint tuple associated with the socket created for the application; and means for responding to the connection query with one or more of the set of bypass endpoint tuples translated from the specified first endpoint tuple and indexed from the address translation map.

44. The computer system of claim 43 wherein:
said means for selecting comprises a connection balancing service running on the system;
the server ATSP transmits the response to the connection query to the client ATSP over the network; and
the client sends a request for connection to the server over the network specifying the selected one of the set of bypass endpoint tuples as the transport address for the connection.

45. The computer system of claim 35 wherein the one or more applications are Sockets applications and the system comprises a Sockets Direct Protocol library.

46. The computer system of claim 35 wherein the one or more applications are Sockets applications and the system comprises a WinSock Direct Protocol library.

47. A computer system having an aggregation of network resources, each of the plurality of resources comprising a bypass protocol stack operable to provide a maximum number of offloaded connections over a network to one or more applications running the computer system, each of the one or more applications uniquely associated with a first port number, the computer system identified on the network by a public IP address, said computer system comprising:
means for identifying each of the plurality of network resources with a unique private host number;
means for creating a socket for each of the one or more applications, said creating comprising;
means for associating a first endpoint tuple with each socket, the endpoint tuple comprising the public IP address identifying the system and the first port number associated with the application for which each socket is created; and
means for translating the first endpoint tuple to a set of bypass endpoint tuples, each of the set comprising a different one of the private IP addresses; and
means for establishing an offloaded connection to one of the applications through a selected one of the plurality of network resources, the offloaded connection defined by a destination transport address comprising the one of the set of bypass endpoint tuples translated from the first endpoint tuple associated with the socket created for the application that comprises the private IP address assigned to the selected one of the network resources.

48. The computer system of claim 47 wherein said means for establishing further comprises means for selecting the one of the plurality of resources based on a connection-balancing policy in view of current connection load and connection capacity information maintained for each of the plurality of network resources.

49. The computer system of claim 47 wherein:
the system further comprises an O/S protocol stack for providing standard connections over the network to the one or more applications running on the system; and
each of the set of bypass endpoint tuples translated from the first endpoint tuple associated with a socket created for one of the applications further comprises a second port number mapped from the first port number associated with that application.

50. The computer system of claim 47 wherein the system is a server, the socket created for each of the applications is a listening socket, and the transport address is a destination transport address.

51. The computer system of claim 47 wherein the system is a client, the socket created for each of the applications is a connecting socket, and the transport address is a source transport address.

52. The computer system of claim 47 further comprising means for maintaining an address translation map, the address translation map comprising the set of bypass endpoint tuples for each of the one or more applications, each of the set of bypass endpoint tuples comprising the mapped second port number for each of applications and a different one of the private IP addresses identifying each of the network resources.

53. The computer system of claim 52 wherein said means for establishing further comprises means for selecting the one of the set of bypass endpoint tuples translated from the first endpoint tuple associated with the application to which the connection is to be established, the selected one of the bypass tuples comprising the private IP address identifying the selected network resource, said means for selecting executing a connection-balancing policy in view of current connection load and connection capacity information maintained for each of the plurality of network resources.

54. The computer system of claim 49 wherein the first port number is a well-known port number.

55. The computer system of claim 54 wherein the applications are Sockets compatible.

56. The computer system of claim 55 wherein the system comprises a WSD library.

57. The computer system of claim 55 wherein the system comprises an SDP library.

58. A computer system of aggregating connection capacity of a plurality of network resources of a computer system, each of the plurality of resources operable to provide a maximum number of offloaded connections over a network to one or more applications running the system, the system further comprising an O/S protocol stack operable to provide conventional connections over the network to the one or more applications, each of the one or more applications uniquely associated with a first port number, the computer system identified on the network by a public IP address, said computer system comprising:
means for identifying each of the plurality of network resources with a unique private host number;
means for creating a socket for each of the applications, said creating comprising:
means for associating a first endpoint tuple with each socket, the endpoint tuple comprising the public IP address identifying the system and the first port number associated with the application for which each socket is created; and
means for translating the first endpoint tuple to a set of bypass endpoint tuples, each of the set comprising a different one of the private IP addresses and a second port number mapped from the first port number associated with the application; and
means for establishing an offloaded connection to one of the applications through a selected one of the plurality of network resources, the offloaded connection defined by a destination transport address comprising the one of the set of bypass endpoint tuples translated from the first endpoint tuple associated with the socket created for the application that comprises the private IP address assigned to the selected one of the network resources.

59. A computer system having an aggregation of a plurality of network resources, each of the plurality of resources operable to provide offloaded connections to one or more applications available on the computer system over a network, each of the one or more applications associated with a well-known port number, the computer system addressable on the network by a public IP address, said computer system comprising:

a library in communication with the one or more applications through an application program interface (API), the library for intercepting API requests to establish a socket for the applications, the library associating a first endpoint tuple with the socket comprising the public IP address and the unique first port number associated with each of the applications, the library also for associating a set of bypass tuples with the socket, the set of bypass tuples being translated from the first endpoint tuple, each of the set comprising a private IP address uniquely identifying a different one of the plurality of network resources; and an address translator service provider (ATSP) in communication with the library, the ATSP for maintaining an address translation map between the first endpoint tuples and the bypass endpoint tuples for each of the sockets created for the one or more applications, the ATSP in communication with the network for receiving a connect query for establishing an offloaded connection to one of the applications, the connect query specifying the first endpoint tuple associated with the socket created for the application, the ATSP providing in response to the connect query at least one of the set of bypass endpoint tuples from the address translation map to be used as a destination transport address to define the offloaded connection.

60. The computer system of claim 59 further comprising a connection balancing service in communication with the ATSP, the service for maintaining connection load and capacity information for each of the plurality of network resources, the service further for selecting one of the set of bypass endpoint tuples as the destination transport address for the offloaded connection based on a connection balancing policy in view of the connection load and capacity information.

61. The computer system of claim 60 further comprising a second plurality of network resources, the second plurality forming an O/S protocol stack for providing standard connections over the network to the one or more applications running on the system; and wherein each of the set of bypass endpoint tuples associated with the socket created for one of the applications further comprises a second port number mapped from the first port number associated with that application.

62. The computer system of claim 61 wherein the library executes the WinSock Direct Protocol.

63. The computer system of claim 61 wherein the library executes the Sockets Direct Protocol.

64. The computer system of claim 59 wherein the service is located on a remote client node, the client node comprising a client instance of the ATSP, the client ATSP generating the connect query.

* * * * *

UNITED STATES PATENT AND TRADEMARK OFFICE
CERTIFICATE OF CORRECTION

| | | |
|---|---|---|
| PATENT NO. | : 7,403,535 B2 | Page 1 of 1 |
| APPLICATION NO. | : 11/013185 | |
| DATED | : July 22, 2008 | |
| INVENTOR(S) | : Prashant Modi et al. | |

It is certified that error appears in the above-identified patent and that said Letters Patent is hereby corrected as shown below:

In column 13, line 46, delete "APL" and insert -- API, --, therefor.

Signed and Sealed this

First Day of September, 2009

David J. Kappos
*Director of the United States Patent and Trademark Office*